(12) United States Patent
Lee et al.

(10) Patent No.: US 9,134,749 B2
(45) Date of Patent: Sep. 15, 2015

(54) INTERNAL VOLTAGE GENERATOR AND METHOD OF GENERATING INTERNAL VOLTAGE

(71) Applicant: SK hynix Inc., Gyeonggi-do (KR)

(72) Inventors: Jin-Woo Lee, Gyeonggi-do (KR); Hyun-Chul Cho, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 14/106,065

(22) Filed: Dec. 13, 2013

(65) Prior Publication Data

US 2015/0070068 A1 Mar. 12, 2015

(30) Foreign Application Priority Data

Sep. 11, 2013 (KR) .......................... 10-2013-0109129

(51) Int. Cl.
*G06F 1/04* (2006.01)
*H02M 3/07* (2006.01)
*H02M 1/00* (2007.01)

(52) U.S. Cl.
CPC . *G06F 1/04* (2013.01); *H02M 3/07* (2013.01); *H02M 2001/0012* (2013.01)

(58) Field of Classification Search
CPC .............. G06F 1/04; G06F 1/06; G06F 1/08; G06F 1/10; H03K 5/13; H03K 5/131; H03K 5/135
USPC .......................... 327/291, 298, 530, 534–535
See application file for complete search history.

(56) References Cited

U.S. PATENT DOCUMENTS 7,102,421 B1 * 9/2006 Ternullo et al. ................ 327/535
7,675,350 B2 * 3/2010 Lee ................................ 327/536
7,768,843 B2 * 8/2010 Park ......................... 365/189.09
8,035,441 B2 * 10/2011 Kim et al. ...................... 327/536

FOREIGN PATENT DOCUMENTS

KR 101024137 3/2011

* cited by examiner

*Primary Examiner* — An Luu
(74) *Attorney, Agent, or Firm* — IP & T Group LLP

(57) ABSTRACT

An internal voltage generator includes an internal voltage control unit suitable for generate an enable signal based on a voltage level of an internal voltage, a clock control unit suitable for generate a control clock having a restricted toggling period based on the enable signal and a clock while controlling the toggling number of the control clock, and an internal voltage generation unit suitable for generate the internal voltage based on the control clock.

10 Claims, 4 Drawing Sheets

INTERNAL VOLTAGE GENERATOR AND METHOD OF GENERATING INTERNAL VOLTAGE

CROSS-REFERENCE TO RELATED APPLICATIONS

The present application claims priority of Korean Patent Application No. 10-2013-0109129, filed on Sep. 11, 2013, which is incorporated herein by reference in its entirety.

BACKGROUND

1. Field

Exemplary embodiments of the present invention relate to a semiconductor design technology, and more particularly, to an internal voltage generator and a method of generating an internal voltage.

2. Description of the Related Art

Generally, most semiconductor devices such as a flash memory use internal voltages internally generated for operations of the semiconductor devices in addition to an external supply voltage VDD and an external ground voltage VSS supplied from the outside.

An internal voltage having a level higher than the external supply voltage VDD or a level lower than the external ground voltage VSS may be generated by using a charge pump circuit. The charge pump circuit generates the internal voltage through a charge pumping method based on a reference voltage corresponding to a target level. The internal voltage having the level higher than the external supply voltage VDD includes a pump voltage, and the internal voltage having the level lower than the external ground voltage VSS includes a back bias voltage.

FIG. 1 is a block diagram illustrating a conventional internal voltage generator for generating a pump voltage, and FIG. 2 is a detailed diagram of a pump unit shown in FIG. 1.

Referring to FIG. 1, the internal voltage generator 10 may include a pump control unit 12 and a pump unit 14. The pump control unit 12 generates a pumping enable signal PUMP_CLK_EN based on a reference voltage VREF and a pump voltage VPUMP. The pump unit 14 generates the pump voltage VPUMP in response to the pumping enable signal PUMP_CLK_EN and a clock CLK.

The pump control unit 12 includes a comparator. The comparator may compare the reference voltage VREF with the pump voltage VPUMP and activate the pumping enable signal PUMP_CLK_EN when a level of the pump voltage VPUMP is lower than the reference voltage VREF.

The pump unit 14 generates the pump voltage VPUMP during an active duration of the pumping enable signal PUMP_CLK_EN based on the clock CLK.

Referring to FIG. 2, the pump unit 14 may include a clock sampling unit 14_1 and a charge pump 14_3. The clock sampling unit 14_1 performs a logical operation on the clock CLK and the pumping enable signal PUMP_CLK_EN to output a pumping clock PUMP_CLK. In other words, the clock sampling unit 14_1 samples the clock CLK during an active duration of the pumping enable signal PUMP_CLK_EN. The charge pump 14_3 generates the pump voltage VPUMP based on the pumping clock PUMP_CLK. The clock sampling unit 14_1 may include an AND gate, and the charge pump 14_3 may include a capacitor.

FIG. 3 is a timing diagram for explaining an operation of the conventional internal voltage generator.

Referring to FIGS. 1 to 3, the pump control unit 12 generates the pumping enable signal PUMP_CLK_EN corresponding to a voltage level of the pump voltage VPUMP. The pump control unit 12 consistently compares the reference voltage VREF with the pump voltage VPUMP and activates the pumping enable signal PUMP_CLK_EN to a logic high level when the voltage level of the pump voltage VPUMP becomes lower than the reference voltage VREF.

The pump unit 14 generates the pump voltage VPUMP based on the clock CLK and the pumping enable signal PUMP_CLK_EN. For example, the clock sampling unit 14_1 generates the pumping clock PUMP_CLK by performing an AND operation on the clock CLK and the pumping enable signal PUMP_CLK_EN. The charge pump 14_3 generates the pump voltage VPUMP based on the pumping clock PUMP_CLK.

However, in the internal voltage generator 10 having the above configuration, the charge pump 14_3 generates the pump voltage VPUMP based on the pumping clock PUMP_CLK. At this time, whenever the pumping clock PUMP_CLK shifts from a logic high level to a logic low level, the capacitor included in the charge pump 14_3 discharges charges charged therein. As the charges are discharged, the current corresponding to the charges is consumed. That is, the current consumption when the pumping clock PUMP_CLK toggles is larger than the current consumption when the pumping clock PUMP_CLK maintains a fixed logic level.

Referring back to FIG. 3, since the pumping clock PUMP_CLK toggles in the active duration of the pumping enable signal PUMP_CLK_EN, the toggling number of the pumping clock PUMP_CLK is determined depending on the active duration of the pumping enable signal PUMP_CLK_EN. The pumping clock PUMP_CLK may unnecessarily toggle (referring 'A') in the active duration of the pumping enable signal PUMP_CLK_EN, and the unnecessary current may be consumed by the charge pump 14_3.

SUMMARY

Various embodiments of the present invention are directed to an internal voltage generator that may reduce the unnecessary toggling number of a control clock, which is used to generate an internal voltage, and a method of generating the internal voltage.

In accordance with an embodiment of the present invention, an internal voltage generator may include an internal voltage control unit suitable for generating an enable signal based on a voltage level of an internal voltage, a clock control unit suitable for generating a control clock having a restricted toggling period based on the enable signal and a clock while controlling the toggling number of the control clock, and an internal voltage generation unit suitable for generating the internal voltage based on the control clock.

In accordance with an embodiment of the present invention, an internal voltage generator may include a pump control unit suitable for generating a pumping enable signal by comparing a pump voltage with a reference voltage, a first pulse generation unit suitable for generating a set pulse and a reset pulse based on the pumping enable signal and a clock, a second pulse generation unit suitable for generating a pumping control clock based on the set pulse and the reset pulse, and a pump unit suitable for outputting the pump voltage through a charge pumping operation based on the pumping control clock.

In accordance with an embodiment of the present invention, a method of generating an internal voltage may include generating an enable signal based on a voltage level of an internal voltage, generating a control clock having a restricted toggling period based on the enable signal and a clock while controlling the toggling number of the control' clock, and generating the internal voltage based on the control clock.

DETAILED DESCRIPTION

Figure 1:
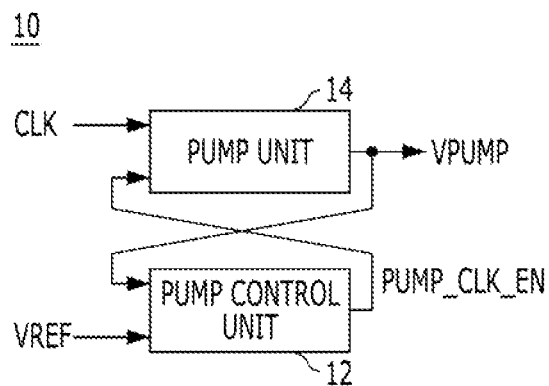
FIG. 1 is a block diagram illustrating a conventional internal voltage generator for generating a pump voltage.
Figure 2:
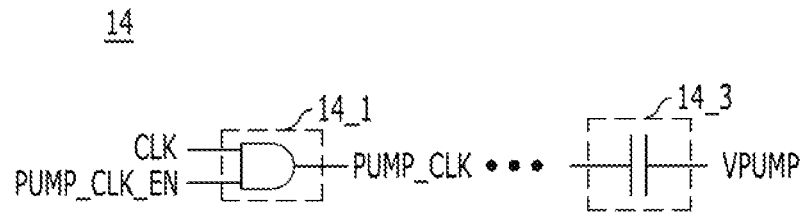
FIG. 2 is a detailed diagram illustrating a pump unit shown in FIG. 1.
Figure 3:
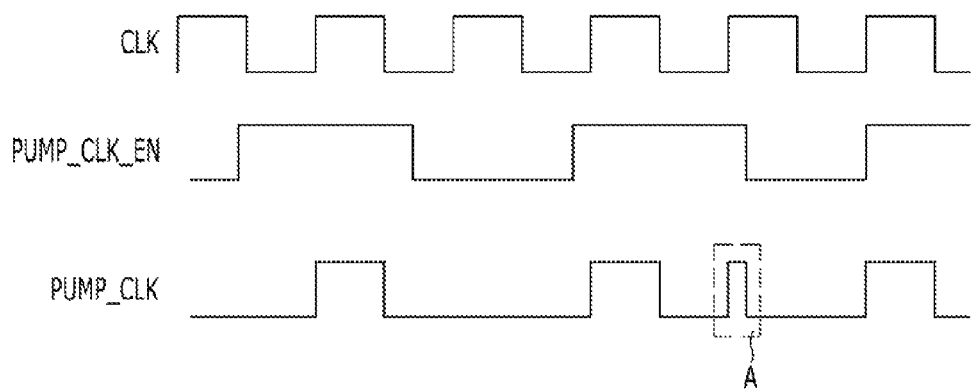
FIG. 3 is a timing diagram for explaining an operation of the conventional internal voltage generator.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, reference numerals correspond directly to the like numbered parts in the various figures and embodiments of the present invention. It is also noted that in this specification, "connected/coupled" refers to one component not only directly coupling another component but also indirectly coupling another component through an intermediate component. In addition, a singular form may include a plural form as long as it is not specifically mentioned in a sentence.

In the following embodiments of the present invention, a pump voltage is exemplary described as an internal voltage.

Figure 4:
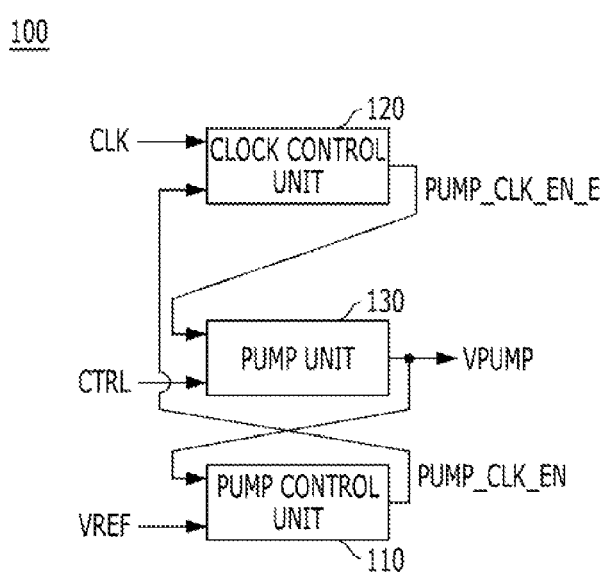
FIG. 4 is a block diagram illustrating an internal voltage generator in accordance with an exemplary embodiment of the present invention.

FIG. 4 is a block diagram illustrating an internal voltage generator in accordance with an embodiment of the present invention.

Referring to FIG. 4 the internal voltage generator 100 may include a pump control unit 110, a dock control unit 120, and a pump unit 130. The pump control unit 110 generates a pumping enable signal (or a first pumping enable signal) PUMP_CLK_EN corresponding to a voltage level of a pump voltage VPUMP. The clock control unit 120 generates a first pumping clock (or a pumping control clock or a second pumping enable signal) PUMP_CLK_EN_E having a restricted toggling period based on the pumping enable signal PUMP_CLK_EN and a dock CLK, and controls the toggling number of the first pumping clock PUMP_CLK_EN_E. The pump unit 130 generates the pump voltage VPUMP based on the first pumping clock PUMP_CLK_EN_E and a control signal CTRL.

The pump control unit 110 may include a comparator that may compare a reference voltage VREF with the pump voltage VPUMP and activate the pumping enable signal PUMP_CLK_EN when the pump voltage VPUMP is lower than the reference voltage VREF.

Figure 5:
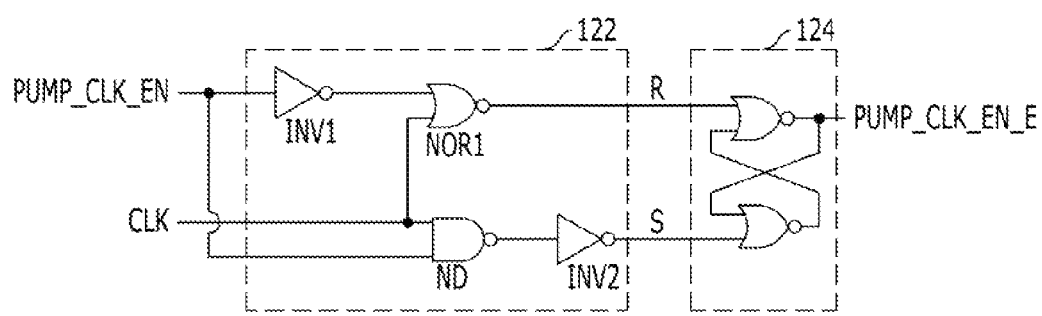
FIG. 5 is a detailed circuit diagram illustrating a clock control unit shown in FIG. 4.

FIG. 5 is a detailed circuit diagram of the clock control unit 120 shown in FIG. 4.

Referring to FIG. 5, the clock control unit 120 may include a restriction clock generation unit 122 and a pumping clock generation unit 124. The restriction clock generation unit 122 generates restriction clocks S and R having a restricted toggling period based on the pumping enable signal PUMP_CLK_EN and the clock CLK. The pumping clock generation unit 124 generates the first pumping clock PUMP_CLK_EN_E based on the restriction clocks S and R. The restriction clocks S and R include a set pulse S and a reset pulse R.

The restriction clock generation unit 122 may include a first NAND gate ND1 for performing a NAND operation on the pumping enable signal PUMP_CLK_EN and the clock CLK, a first inverter INV1 for inverting an output signal of the first NAND gate ND1 to output the set pulse S, a second inverter INV2 for inverting the pumping enable signal PUMP_CLK_EN, and a first NOR gate NOR1 for performing a NOR operation on an output signal of the second inverter and the clock CLK to output the reset pulse R. The restriction clock generation unit 122 generates the set pulse S and the reset pulse R that have phases opposite to each other during an active duration of the pumping enable signal PUMP_CLK_EN based on the pumping enable signal PUMP_CLK_EN and the clock CLK.

The pumping clock generation unit 124 may include an SR latch for generating the first pumping clock PUMP_CLK_EN_E that is activated in response to the set pulse S and is inactivated in response to the reset pulse R. The pumping clock generation unit 124 generates the first pumping clock PUMP_CLK_EN_E whose logic level, which is latched in response to the set pulse S and the reset pulse R, is maintained until a next pulse duration of the set pulse S when a pulse width of the set pulse S is narrower than a predetermined width (e.g., 0.5 tCK), FIG. 6 is a detailed circuit diagram of the pump unit 130 shown in FIG. 4.

Figure 6:
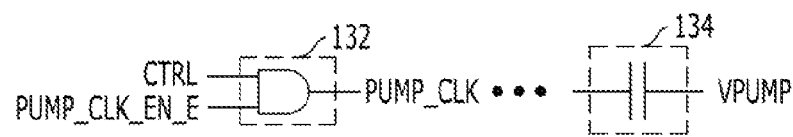
FIG. 6 is a detailed circuit diagram illustrating a pump unit shown in FIG. 4.

Referring to FIG. 6, the pump unit 130 may include a pumping clock driver 132 and a charge pump 134. The pumping clock driver 132 generates a second pumping clock PUMP_CLK based on the first pumping clock PUMP_CLK_EN_E and the control signal CTRL. That is, the pumping clock driver 132 drives the first pumping clock PUMP_CLK_EN_E as the second pumping clock PUMP_CLK in response to the control signal CTRL. From another point of view, the pumping dock driver 132 may sample the first pumping clock PUMP_CLK_EN_E during an active duration of the control signal CTRL. The charge pump 134 generates the pump voltage VPUMP based on the second pumping clock PUMP_CLK.

The pumping clock driver 132 may include an AND gate for performing an AND operation on the first pumping clock PUMP_CLK_EN_E and the control signal CTRL. The control signal CTRL may be fixed to a predetermined voltage level, for example, a logic high level. In such case, the second pumping clock PUMP_CLK follows a waveform of the first pumping clock PUMP_CLK_EN_E. Further, the charge pump 134 may include a capacitor.

The operation of the internal voltage generator 100 having the above configuration will be described with reference to FIG. 7.

Figure 7:
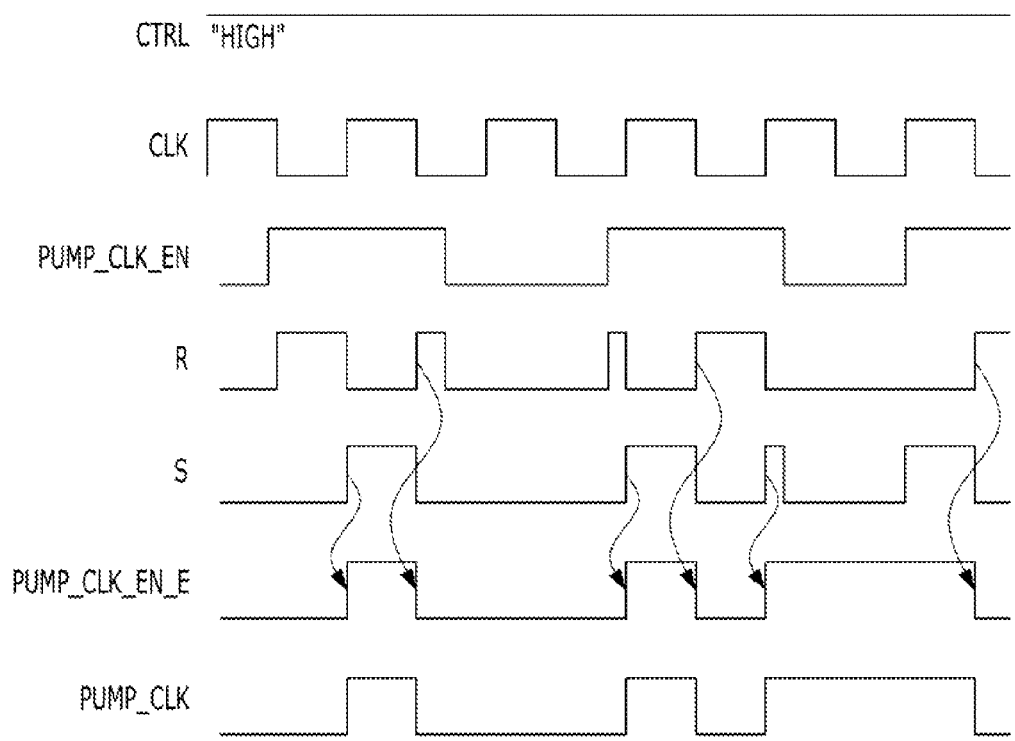
FIG. 7 is a timing diagram for explaining an operation of the internal voltage generator in accordance with the embodiment of the present invention.

FIG. 7 is a timing diagram for explaining an operation of the internal voltage generator in accordance with the embodiment of the present invention.

Referring to FIGS. 4 to 7, the method of generating internal voltage may include generating a pumping enable signal PUMP_CLK_EN corresponding to a voltage level of a pump voltage VPUMP, generating a first pumping clock PUMP_CLK_EN_E based on the pumping enable signal PUMP_CLK_EN and a clock CLK, and generating the pump voltage VPUMP based on the first pumping clock. PUMP_CLK_EN_E.

In the generating of the pumping enable signal PUMP_CLK_EN, the pumping control unit 110 compares a reference voltage VREF with the pump voltage VPUMP, and generates the pumping enable signal PUMP_CLK_EN based on the comparison result. For example, the pumping control unit 110 activates the pumping enable signal PUMP_ CLK_EN to a logic high level when the pump voltage VPUMP is lower than the reference voltage VREF.

In the generation of the first pumping clock PUMP_CLK_EN_E, the clock control unit 120 restrictively outputs the clock during an active duration of the pumping enable signal PUMP_CLK_EN. A logical level of the clock CLK, which is latched when the pumping enable signal PUMP_CLK_EN is in an active state, is maintained during the pumping enable signal PUMP_CLK_EN is in an inactive state (i.e., until the pumping enable signal PUMP_CLK_EN is active state again). In detail, the restriction clock generation unit 122 generates the set pulse S corresponding to the clock CLK, and the reset pulse R corresponding to an inverted signal of the clock CLK when the pumping enable signal PUMP_CLK_EN is activated to a logic high level. Meanwhile, the restriction clock generation unit 122 generates the set pulse S and the reset pulse R fixed to a logic low level when the pumping enable signal PUMP_CLK_EN is inactivated to a logic low level. The pumping clock generation unit 124 generates the first pumping clock PUMP_CLK_EN_E that is activated in response to the set pulse S and is inactivated in response to the reset pulse R.

In the generating of the pump voltage VPUMP, a voltage level of the pump voltage VPUMP is raised by a charge pumping operation until the voltage level of the pump voltage VPUMP is higher than that of the reference voltage VREF in response to the first pumping clock PUMP_CLK_EN_E. In detail, the pumping dock driver 132 generates a second pumping clock PUMP_CLK corresponding to the first pumping clock PUMP_CLK_EN_E in response to the control signal CTRL fixed to a logic high levels. The charge pump 134 performs a charge pumping operation based on the second pumping clock PUMP_CLK.

According to the embodiment of the present invention, the toggling number of the pumping clock, which is used to generate the pump voltage may be reduced. Thus, the current consumption due to unnecessary toggling of the pumping clock may be prevented.

While the present invention has been described with respect to the specific embodiments, it will be apparent to those skilled in the art that various changes and modifications may be made without departing from the spirit and scope of the invention as defined in the following claims.

What is claimed is:

1. An internal voltage generator comprising:
    an internal voltage control unit suitable for generating an enable signal based on a voltage level of an internal voltage;
    a clock control unit suitable for generating a control clock based on the enable signal and a clock while controlling a toggling number of the control clock; and
    an internal voltage generation unit suitable for generating the internal voltage based on the control clock,
    wherein the clock control unit includes:
    a first clock generation unit suitable for generating a set pulse and a reset pulse based on the enable signal and the clock; and
    a second clock generation unit suitable for generating the control clock activated in response to the set pulse and inactivated in response to the reset pulse.

2. The internal voltage generator of claim 1, wherein the clock control unit generates a restriction clock having a restricted toggling period based on the enable signal and the clock, and generates the control clock whose logic level, which is latched in response to the restriction clock, is maintained until a next pulse duration of the restriction clock when a pulse width of the restriction clock is narrower than a predetermined width.

3. The internal voltage generator of claim 1, wherein the internal voltage control unit compares the internal voltage with a reference voltage, and generates the enable signal corresponding to the comparison result.

4. The internal voltage generator of claim 1, wherein the set pulse corresponds to the clock, and wherein the reset pulse corresponds to an inverted signal of the clock, during an active duration of the enable signal.

5. The internal voltage generator of claim 1, wherein the second clock generation unit includes an SR latch.

6. The internal voltage generator of claim 1, wherein the internal voltage generation unit includes:
    a clock driver suitable for driving the control clock in response to a control signal; and
    an internal voltage generator suitable for generating the internal voltage based on the driven control clock.

7. The internal voltage generator of claim 6, wherein the control signal is fixed to a given voltage level.

8. A method of generating an internal voltage, the method comprising:
    generating an enable signal based on a voltage level of an internal voltage;
    generating a control clock based on the enable signal and a clock while controlling the toggling number of the control clock; and
    generating the internal voltage based on the control clock,
    wherein a logical level of the control clock, which is latched when the enable signal is in an active state, is maintained until the enable signal is active state again.

9. The method of claim 8, wherein the generating of the internal clock comprises:
    generating a restriction clock having a restricted toggling period based on the enable signal and the clock, and
    generating the control clock whose logic level, which is latched in response to the restriction clock, is maintained until a next pulse duration of the restriction clock when a pulse width of the restriction clock is narrower than a predetermined width.

10. The method of claim 9, wherein the generating of the internal voltage includes:
    outputting a pump voltage as the internal voltage through a charge pumping operation based on the internal clock.

* * * * *